United States Patent [19]
Mitts et al.

[11] Patent Number: 6,002,686
[45] Date of Patent: Dec. 14, 1999

[54] CELL INDICATION IN THE CELL FLOW OF AN ATM SYSTEM

[75] Inventors: Håkan Mitts, Helsinki; Jukka Immonen; Harri Hansen, both of Espoo, all of Finland

[73] Assignees: Nokia Mobile Phones Limited, Salo; Nokia Telecommunications Oy, Espoo, both of Finland

[21] Appl. No.: 08/736,044

[22] Filed: Oct. 22, 1996

[30] Foreign Application Priority Data

Dec. 1, 1995 [FI] Finland ................................. 955814

[51] Int. Cl.⁶ ............................ H04L 12/28; H04L 12/56
[52] U.S. Cl. ................................. 370/394; 370/395
[58] Field of Search .................... 370/389, 394, 370/395, 465, 464, 470, 471, 473, 474, 476

[56] References Cited

U.S. PATENT DOCUMENTS

| | | | |
|---|---|---|---|
| 4,712,214 | 12/1987 | Meltzer et al. | 371/32 |
| 5,159,452 | 10/1992 | Kinoshita et al. | 370/394 |
| 5,319,360 | 6/1994 | Schrodi et al. | 340/825.02 |
| 5,333,135 | 7/1994 | Wendorf | 370/394 |
| 5,337,313 | 8/1994 | Buchholz et al. | 370/94.1 |
| 5,345,448 | 9/1994 | Keskitalo | 370/95.3 |
| 5,396,490 | 3/1995 | White et al. | 370/394 |
| 5,410,733 | 4/1995 | Niva et al. | 455/33.2 |
| 5,483,668 | 1/1996 | Malkamaki et al. | 455/33.2 |
| 5,524,009 | 6/1996 | Tuutijarvi et al. | 370/95.3 |
| 5,537,409 | 7/1996 | Moriyama et al. | 370/394 |
| 5,606,558 | 2/1997 | Daniel et al. | 370/395 |

FOREIGN PATENT DOCUMENTS

0 633 678 A1  1/1995  European Pat. Off. .

*Primary Examiner*—Ajit Patel
*Attorney, Agent, or Firm*—Perman & Green, LLP

[57] ABSTRACT

A reference is made to ATM cells by dividing the cells into groups (31, 32, 33, 34) which are identified on the basis of a group-oriented serial number and/or on the basis of the combination of identifiers included in the cells of the group. In the latter case, the combination of the identifiers is compared with a given predefined aperiodic character string. A given cell within the group is identified on the basis of which cell it is counting from the beginning and/or from the end of the group, or on the basis of the identifier included in the cell.

3 Claims, 1 Drawing Sheet

CELL INDICATION IN THE CELL FLOW OF AN ATM SYSTEM

BACKGROUND OF THE INVENTION

The invention is generally related to packet-oriented or cell-oriented processing of data units in packet or cellular data transmission, and especially to the cell-oriented identification of ATM cells for keeping the cell flow consisting of them in sequence.

The ATM (Asynchronous Transfer Mode) is a strong candidate for a fast future communication protocol, for example, in B-ISDN networks (Broadband Integrated Services Digital Network) and generally in communications between data trans-mission devices. The network consists of nodes and terminals, and of links between them. In an ATM network, data is transferred as cells in digital form, each cell comprising a so-called payload of 48 bytes and a header of 5 bytes. In order for the amount of the header information to be kept at a minimum, the headers do not contain complete routing information between the transmitting and the receiving devices but only information on the virtual path and channel in which the respective data transfer connection is carried. The nodes of the network contain the necessary routing information on the basis of which the respective identifiers of the virtual path and channel are interpreted as a reference for the next respective node.

The use of the cell header is defined in the specifications of the ATM system. The header contains a Virtual Path Identifier (VPI) of 8–12 bits, a Virtual Channel Identifier (VCI) of 16 bits, a Generic Flow Control Field of 0–4 bits, 3 bits which are used to indicate the type of payload, one bit which is used to indicate the priority rating of the cell, and 8 bits which contain the error correction code calculated on the basis of the rest of the cell header. The cell header in particular does not contain any information that individually identifies the cell in question, hence the success of the data transmission depends on maintaining the relative order of the cells. The ATM as such does not contain mechanisms for correcting errors caused by the loss of cells or by misordering. Errors on the cell level cause a Protocol Data Unit (PDU) containing several cells and defined on a higher level to be detected erroneous and discarded, whereby it might be necessary to retransmit a large number of correct cells in addition to the incorrect ones.

Traditionally, ATM-links are perceived as wired circuits or optical cable connections, whereby the above-mentioned requirement for maintaining the relative order of the cells has not caused major problems. However, it is anticipated that the terminals of future data transfer solutions must have the same kind of mobility and independence of permanent connections as mobile phones of cellular networks already have.

Because of its effectiveness and the provision to flexibly modify it, the cellular radio network is a likely architecture in the future. A typical cellular network comprises several base stations (BS) which are affiliated with—possibly through a base station controller (BSC)—a mobile switching center (MSC). In a large cellular network there are numerous mobile switching centers as well as base stations and base station controllers that work under the mobile switching centers.

A typical phenomenon of cellular systems is the change of base stations, i.e., the handover, where a given mobile terminal moves from the transmission range of a first base station to that of a second base station, whereby essentially all the data transmission between the terminal in question and the network is rerouted through the new base station. A perfect synchronization of the operation during the handover is often not possible, which may result in packet loss, duplication or misordering. This is especially severe in the ATM system where a successful transmission of all the cells and ordering are a prerequisite for effective data transmission.

The article "BAHAMA: A Broadband Ad-Hoc Wireless ATM Local-Area Network", Proc. ICC '95, Jun. 18–22 1995, Seattle, written by K. Y. Eng et al., discloses a method in which the GFC field in the header segments of ATM cells is used to implement cell-oriented sequential numbering. The purpose is to contribute to the synchronization and combination of cell flows that arrive at a given conjunction point along two parallel routes. The purpose of numbering the cells is aimed particularly at identifying them unequivocally, so that cells are not duplicated or lost when the cell flows are combined and that their order will remain the same. In this case, a problem might occur because only numbers from 0 to 15 can be presented in the GFC field with a maximum of four bits, whereby the numbering cycle remains so short that cells with the same number belonging to subsequent cycles may become misordered.

SUMMARY OF THE INVENTION

The purpose of the present invention is to provide a method which can be used to identify the cells of a fast cellular data transmission flow to the accuracy required by the processing.

The objects of the invention are achieved by using numbering in which the individualization of a given cell is effected by considering it as part of a group of several cells, whereby a reference can be made either to the group in question or to a given cell within it.

The method according to the invention for cell reference is characterized in that the reference is effected on at least two levels; groups are formed of the cells on the first level, where the desired group is identified on the basis of a group-oriented identifier, and a given cell within the said group is identified on the second level.

The invention is based on the consideration of cells as groups of cells of a given size which jointly contain a character that is characteristic of the group in question. The said character can be a group-oriented cyclic serial number, whereby its roll-over is slower in proportion to the size of the cell group than if the numbering is effected one cell at a time. Moreover, the number or other identifier associated with a cell or a group of cells can be compared with a predefined aperiodic set of identifiers on the basis of which we know which identifier should follow a given combination of preceding identifiers that have already been identified.

The invention specifically provides the advantage that a particularly large part of one cell need not be used to transmit the identifier data but the cell capacity can be effectively dedicated to use of the actual data to be transferred.

BRIEF DESCRIPTION OF THE DRAWING

In the following, the invention is described in more detail with reference to the preferred illustrative embodiments and the appended drawings in which.

Identical reference numbers and designations are used for corresponding parts in the figures.

DETAILED DESCRIPTION OF THE DRAWING

When numbering the cells, it is not necessarily practical to number each cell separately. The method presented in FIGS. 1a and 1b can thus be applied. Cell flow 30 is divided into groups, of which groups 31, 32, 33, and 34 are presented in FIGS. 1a and 1b, comprising four cells each. The invention does not actually require the groups to contain an equal number of cells or to be in sequence, but the size of the groups may vary and they can overlap in different manners in the cell flow. However, the invention is easiest to understand in the form presented by FIGS. 1a and 1b.

The first cell of groups 31–34 (the right-hand cell in the figures) is called a counter cell, whereby its VCI field, GFC field or some other suitable part (not shown separately in the figures) contain a serial number. The cycle of the counter, i.e., the value after which the serial number is reset, depends on the number of bits used for this purpose. In the embodiments of the figures, four bits are used to present the serial number, so that the counter values range between 1–15, including the limit values. In the other cells of the groups, the counter bits are zeros or they can be the same as in the first cell of the group.

Moreover, the counter cells can be reserved solely for the use as a counter, so that fairly high counter values can be transmitted in their pay load part. In this case, payloads in the other cells of the group are naturally being used by the counter bits for the actual data to be transferred.

The number in each cell of the figures presents the value of the counter bits of the respective cell. The identification of the first cell of the group can be facilitated by setting them to zero in all except the first cell of the group. A given value in the counter bits is understood to refer to the entire group of cells. A reference can be made separately to a given cell within the group by stating which cell is in question as counted from the beginning of the group. The cells themselves do not have any knowledge as to which cell of the group is in question; hence, a reference to number N cell within a group can succeed only if none of the N-1 first cells of the group have been lost and if the position of the cell that is being referred to in the group has not altered. Both prerequisites are properties that are already required in the ATM system. They do not therefore place unreasonable additional demands on the reliability of the system.

Figure 1A:
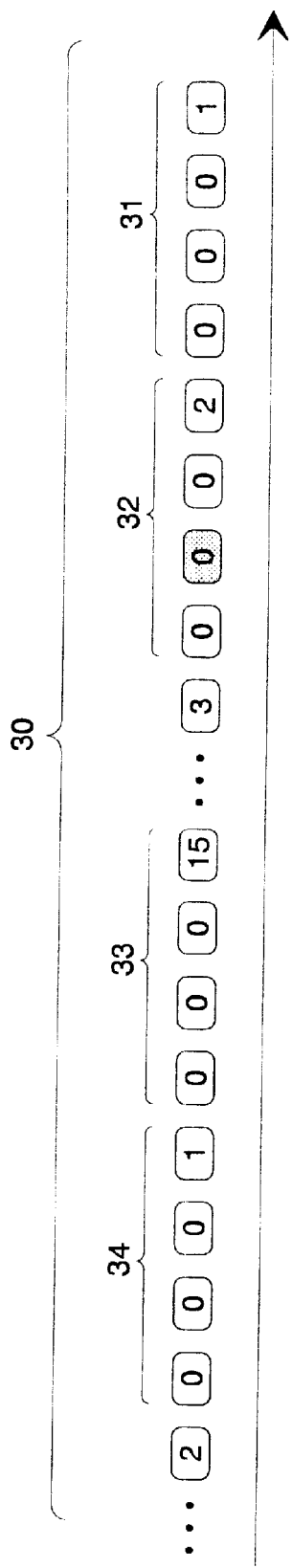
FIG. 1a presents the cell reference method according to a preferred embodiment of the invention.
Figure 1B:
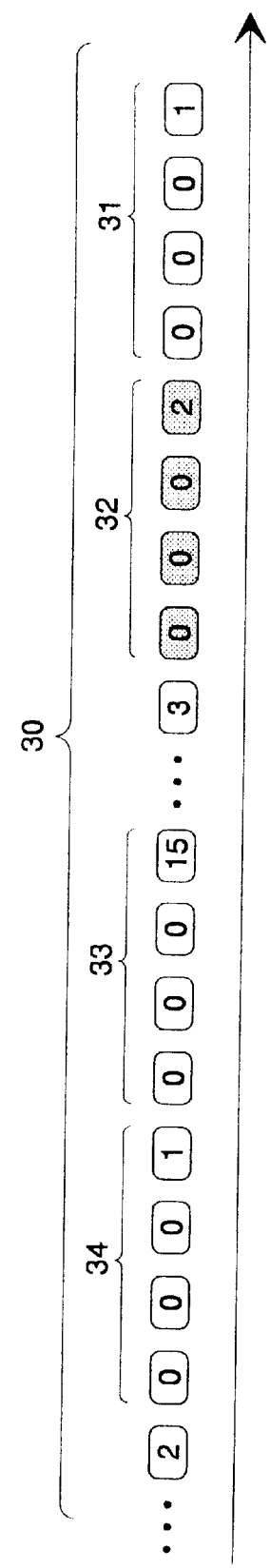
FIG. 1b presents a different type of reference in the embodiment of FIG. 1.

FIG. 1a presents a shaded cell which is identified by means of the definition 'counter=2, third cell'. In FIG. 1a, the entire group of cells is referred to by means of the definition 'counter=2'. Since there are several cells in the group, the resetting of the counter to the beginning (cf. groups 31 and 34) takes a great deal longer than if each cell is numbered separately with a serial number from 0–15. The group-oriented numbering decreases the risk of confusion which is otherwise caused by the relatively short cycle of the counter and by the fact that there can be several hundred cells simultaneously in a given cell buffer.

Other identification protocols can be applied in addition to regular serial numbering, or instead of it. One possibility is to generate and agree on beforehand, between all the devices participating in the data transmission, an aperiodic set of numbers, such as the decimals of pi. The transmitting device provides sequentially, as identifiers of given cells in the cell flow, numbers from the said aperiodic set of numbers. Thus, the receiving device knows that if, e.g., numbers '-3-8-2' occur in a given position in the agreed set of numbers, cell 2 should follow cells 3 and 8 which have been received sequentially. Since the statistical probability of two given numbers occurring sequentially in an aperiodic set is about $\frac{1}{100}$, a counter cycle of a hundred cells is achieved effectively by a simple quantity identifier. Naturally, the set of numbers need not consist of numbers of the decimal system.

A reference to cells on two levels has been described above, so that on the first level, the group of cells is identified on the basis of a given serial number value or by comparing several sequential identifiers with a predefined aperiodic sequence, and a given cell in the group is identified on the basis of its location or by a cell-oriented identifier. However, the invention can be applied on a wider range of levels, so that first a given, fairly large group of cells is identified, after which a smaller subgroup within it, and so on. Either one of the above methods can be applied on all levels.

By using the method according to the invention, the cells of a data transmission system, particularly those of the ATM system, can be individually identified to an accuracy of the respective state-of-the-art processing mode because the indication can be directed to a given cell or to a group of cells. The method only requires some bits for the identification data, hence it does not place an unreasonable burden on the performance of the data transmission.

What is claimed is:

1. A method for referring to given cells in a data transmission system that transfers data and cells, the method comprising steps of:

effecting reference on at least two levels by forming groups (31, 32, 33, 34) of the cells on a first one of the two levels; and identifying the desired group on the basis of a group-oriented identifier, and where a given cell is identified within said group of a second one of the two levels;

wherein the reference is effected on at least two levels, where groups of similarly valued cells are formed of the cells on the first level, from which the desired group is identified on the basis of a group-oriented identifier, and wherein a given cell is identified within a cell group on the second level without a cell-specific identifier, and based on its position within the cell group as counted from the beginning and/or the end of the cell group.

2. A method according to claim 1, further comprising steps of:

numbering said groups of cells (31, 32, 33, 34) by using a cyclic serial number which is included in at least one cell in each group of cells; and identifying a given cell in the group by counting which cell it is from the beginning and/or the end of the group.

3. A method according to claim 1, further comprising steps of:

marking said cells sequentially by using characters which are placed in the same order in a given predefined aperiodic character string; and identifying a given group of cells on the basis of how the characters of the cells placed in it are located as a group in said predefined character string.

* * * * *